United States Patent [19]

Van Rooijen

[11] E Patent Number: Re. 33,456

[45] Reissued Date of Patent: Nov. 27, 1990

[54] ROTATING HELICAL CONVEYOR SYSTEM

[75] Inventor: Gerardus H. Van Rooijen, Meldegem, Belgium

[73] Assignee: CTB, Inc., Milford, Ind.

[21] Appl. No.: 233,231

[22] Filed: Aug. 17, 1988

Related U.S. Patent Documents

Reissue of:

[64] Patent No.: 4,640,230
Issued: Feb. 3, 1987
Appl. No.: 806,708
Filed: Dec. 9, 1985

[51] Int. Cl.[5] ..... A01K 39/012

[52] U.S. Cl. ..... 119/57.7; 119/57.92; 198/716

[58] Field of Search ..... 119/52 AF, 18, 51 R; 198/834, 716, 734, 727

[56] References Cited

U.S. PATENT DOCUMENTS

| | | | |
|---|---|---|---|
| 2,232,606 | 2/1941 | Hudson | 198/716 X |
| 2,908,379 | 10/1959 | Hamilton | 198/659 |
| 3,003,964 | 10/1961 | Bailey | 198/716 X |
| 3,893,423 | 7/1975 | Hostetler | 119/52 AF |
| 3,918,405 | 11/1975 | Hostetler | 119/52 AF |
| 4,060,055 | 11/1977 | Skinner | 119/48 |
| 4,495,894 | 1/1985 | Swartzendruber | 119/51 R |
| 4,640,230 | 2/1987 | Van Rooijen | 119/52 AF |

FOREIGN PATENT DOCUMENTS

| | | |
|---|---|---|
| 802597 | 9/1936 | France . |
| 762411 | 11/1956 | United Kingdom . |

*Primary Examiner*—John Weiss
*Attorney, Agent, or Firm*—Richard Bushnell

[57] ABSTRACT

A conveyor system for delivering feed to a plurality of animal cages arranged in rows said system comprises an endless conduit extending along a conduit run past at least one of the rows of cages and through a feed trough disposed adjacent the faces of the row of cages. An elongate, continuous, endless material moving element extends through the endless conduit run and is longitudinally movable therethrough, and a driver element advances the endless material moving element along and through the conduit run. The material moving element comprises an elongate helical member defining a longitudinal helix axis and bendable about this axis for following the endless conduit run. Cooperating structure on the driver element and on the helical member rotates the helical member about the helix axis thereof while simultaneously axially advancing the helical member along and through the conduit run.

7 Claims, 3 Drawing Sheets

ROTATING HELICAL CONVEYOR SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to feeding systems for caged or confined animals such as poultry. More particularly, the invention concerns a feeding system in which feed is continuously agitated and intermixed during delivery and conveyance along a row of cages or other confinement structures, so as to encourage delivery of substantially equal amounts and kinds of feeds to each confined animal.

Large-scale poultry operations utilize sophisticated equipment for maintaining relatively large flocks of poultry in relatively large poultry houses. In egg producing or layer operations, the birds are normally confined in cages so that food and water can be delivered economically and in accurately rationed amounts, as well as at desired intervals of time. Moreover, these cages are generally constructed and arrayed so as to facilitate feeding, and, in layer operations, egg collection, by devices which travel generally linearly along linearly arrayed rows of cages. One particularly advantageous cage arrangement takes the form of linearly arranged cages stacked in a stepped-back pyramidal array, as shown for example in U.S. Pat. No. 4,060,055.

When the birds are properly confined and fed, high flock performance levels can be achieved and maintained. For example, a maximum number of eggs can be contained from the laying hens while utilizing a minimum amount of food and water. Such considerations are important to the economic viability of a large-scale poultry operation.

The mechanized delivery of feed in such poultry operations is usually accomplished by a feed conveyor system having a series of feed delivery conduits and feed troughs extending past the face of each row of cages. Within these troughs and conduits are located feed conveyor or feed carrying elements, which may take various forms.

Some such systems use a helical, auger-like coil element of extended length as a driver element. As this helical or auger element is rotated, feed is moved along the associated conduits and troughs with an auger motion, but without axial displacement of the coil element or auger. Such devices are shown for example in U.S. Pat. Nos. 3,918,405 and 3,893,423. Other forms of feed conveying devices have also been utilized in the prior art. In a variation on the above arrangement, a similar helical coil is driven axially, but without rotation through a series of conduits and/or feed troughs, as shown in U.S. Pat. No. 4,495,894 to Swartzendruber. Advantageously, this arrangement permits the relatively flexible coil or helical element to be readily driven around [corner] *corners*, bends or the like so that a continuous or endless such element may be in effect looped around a path to deliver feed to oppositely facing or back-to-back rows of cages.

As indicated above, feed rations which are accurate and uniform both in quantity and quality are to be repeatedly delivered to each poultry-containing cage. That is, it is desirable that each bird receive a certain amount of each constituent in the feed mix, and that the amounts of each constituent are not varied excessively throughout the delivered rations. However, since the varying feed constituents have different sizes and masses, the heavier or more dense feed constituents will tend to fall to the bottom of the conveyor or trough as the feed is advanced. Likewise, the birds will tend to pick off the upper layers of feed from the trough, such that the lighter constituents may tend to be picked over by the birds at or near the upstream or delivery end of the conveyor system prior to reaching birds downstream.

Accordingly, two additional factors are also desirable in a delivery system. Firstly, the birds should be prevented from picking over the feed until the feed has been delivered throughout the row or rows of cages serviced by a given endless conveyor or conveyor loop. Secondly, the feed should continue to be agitated during delivery to maintain a relatively uniform mix of feed delivered to each cage, and prevent heavier or more dense constituents from falling into the bottom of the trough or conveyor.

OBJECTS AND SUMMARY OF THE INVENTION

Accordingly, it is a general object of the invention to provide a feed conveyor system for confined animals and the like in which the animals are substantially prevented from consuming the feed until the feed has been delivered to all of the animals serviced by a given conveyor loop and wherein the feed is intermixed and agitated during delivery to assure a substantially uniform feed mix as delivered to each animal. In this way, proper amounts of each constituent in the feed mix are delivered to each of the consuming animals.

A related object is to provide a feed system in accordance with the foregoing object which is relatively simple and inexpensive in its manufacturer and yet highly reliable in operation.

Briefly, and in accordance with the invention a conveyor system for delivering feed to a plurality of animal cages arranged in rows comprises an endless conduit extending along a conduit run past at least one of said rows of cages and through a feed trough disposed adjacent the faces of said row of cages; an elongate, continuous, endless material moving element extending through said endless conduit run and longitudinally movable therethrough, and driver means for advancing said endless material moving element through said conduit run; wherein said material moving element comprises an elongate helical member defining a logitudinal helix axis and bendable about said axis for following said endless conduit run, and further including cooperating means on said driver means and on said helical member for rotating said helical member about the helix axis thereof while simultaneously axially advancing said helical member along and through said conduit run.

BRIEF DESCRIPTION OF THE DRAWINGS

The features of the present invention which are believe to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Figure 1:
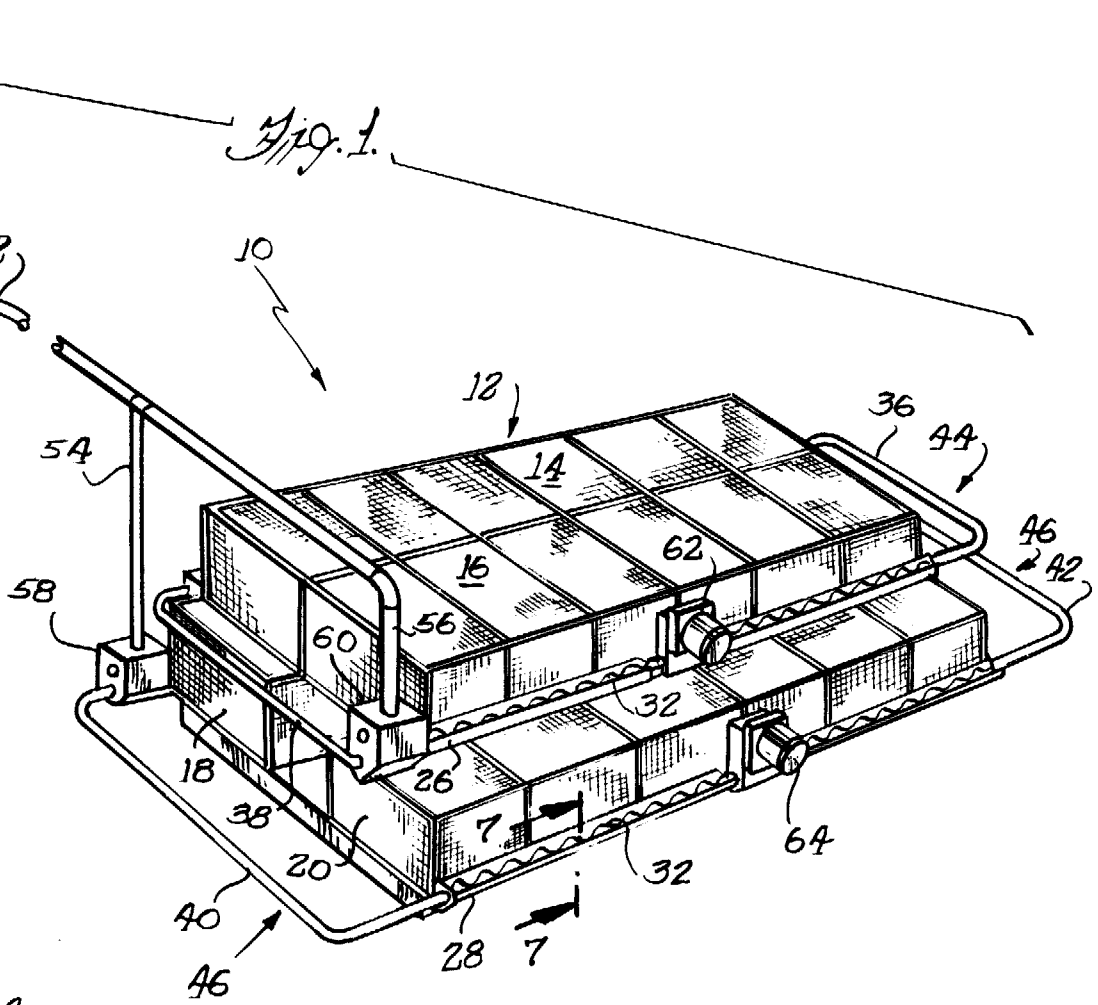
FIG. 1 is a perspective view of arrayed animal cages and a feed delivery system therefor, in connection with which the conveyor system in accordance with the invention may advantageously be utilized.
Figure 2:
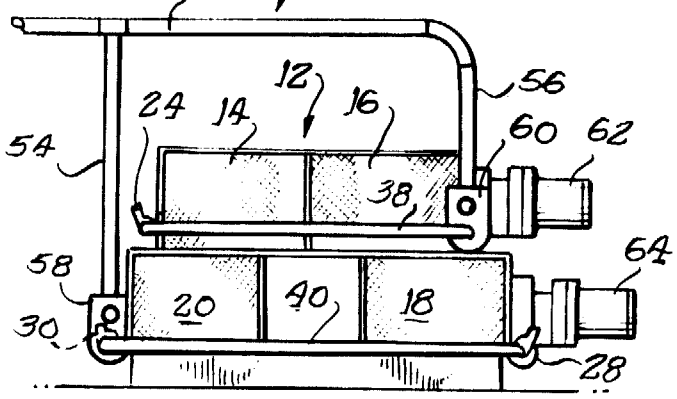
FIG. 2 is a side elevation of the cages and feed delivery system of FIG. 1.

Turning now to the drawings and initially to FIGS. 1 and 2, the system of the invention is most advantageously utilized in connection with a poultry confinement and feeding system indicated generally by reference numeral 10. This system 10 utilizes an array of poultry confinement cages 12 which are arrayed in a linear fashion in generally oppositely facing, pyramidal or stepped-back multi-level configuration, in accordance with U.S. Pat. No. 4,060,055. It is contemplated, however, that the conveying system of the invention may be utilized with other cage constructions and arrangements as well.

In the illustrated embodiment, a pair of back-to-back upper rows of cages 14 and 16 face in opposite directions, and similarly, a pair of back-to-back lower rows of cages 18 and 20 face in opposite directions. However, the lower rows 18 and 20 will be seen to be spaced apart somewhat at their backs to a form a generally pyramid-like or stepped-back arrangement with the rows 14 and 16 thereabove. Adjacent the faces of each of these rows of cages 14, 16, 18, 20 is a corresponding, elongated, open-top trough 24, 26, *28*, and 30. These troughs can be configured, as well as located and mounted in association with the cages, as shown for example in FIG. 7.

Within these troughs are disposed feed delivery elements such as elements 32 and 34 which are somewhat diagrammatically [ilustrated] *illustrated* in FIG. 1. Moreover, troughs 24, 26 on the upper level, and troughs 28, 30 on the lower level are preferably respectively interconnected to form upper and lower endless feed conduits or loops 44, 46 by respective end connector conduit members 36, 38, and 40, 42. Accordingly, the feed delivery elements 32 and 34 preferably comprise continuous, "endless" members which extend around each of the feed conduit loops 44, 46 formed by each of the respective sets of troughs and interconnecting end conduits. Feed may be delivered to these two endless feed delivery loops from a suitable feed storage hopper or container 50 by way of a main feed delivery conduit or header 52. This main feed delivery conduit 52 feeds a pair of delivery drop tubes 54, 56 which in turn feed the respective upper and lower feed conduit loops 44 and 46 by way of respective drop boxes 56 and 58.

These latter drop boxes 56 and 58 are designed to correctly meter the feed received from the header 52 by way of drop tubes 54 and 56 to assure that a desired level of feed is maintained in the associated troughs. This desired level of feed is indicated for example in FIG. 7. However, the drop boxes 58 and 60 form no part of the present invention and will not be described further herein, except to say that the conveyor members or augers 32 and 34 extend through these drop boxes to received the metered feed therefrom.

Each of the endless feed delivery members 32 and 34 is driven by at least one drive unit or assembly 62, 64, which units are shown diagrammatically in FIGS. 1 and 2.

Referring now to FIGS. 3 through 6, details of the conveyor system in accordance with the invention will be described. Each feed delivery loop includes one such conveyor system, which comprises one of the endless feed delivery members 32, 34 and a drive member or portion of the associated drive means or system 62, 64. Since these members are substantially identical with respect to each feed loop 44, 46 only one such arrangement is illustrated and described hereinbelow. As will be discussed more fully hereinbelow, the drive member and delivery member are configured such that the feed delivery member is simultaneously advanced and rotated within the conduits and troughs forming each feed loop.

Figure 3:
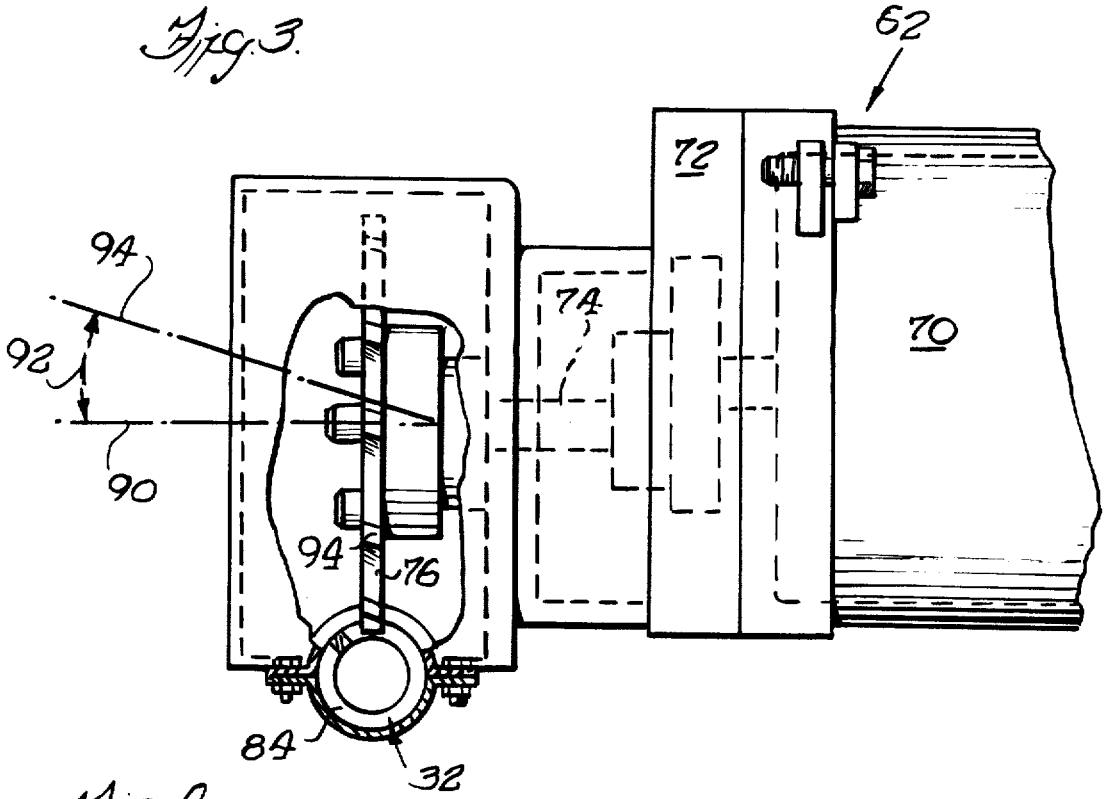
FIG. 3 is an enlarged side elevation, partially broken away, illustrating a rotating, longitudinally advancing conveyor system in accordance with the invention.

Referring initially to FIG. 3, the drive system or assembly 62 will be seen to comprise a motor 70 and a gear box 72, both of which are somewhat diagrammatically illustrated. The gear box 72 has an output shaft 74 which mounts an impellar wheel 76 for rotation thereupon. As will be seen presently, this impellar wheel 76 comprises the driver element for driving the conveyor or endless feed delivery member 32.

Figure 4:
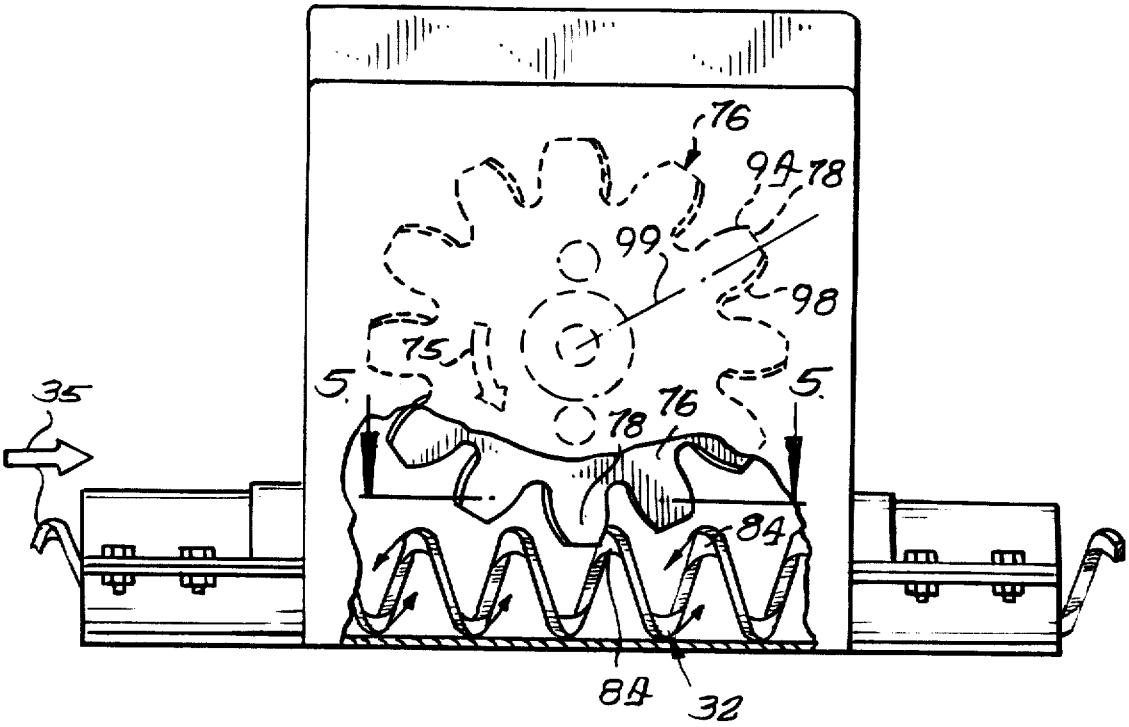
FIG. 4 is a front plan view, partially broken away, of the system of FIG. 3.
Figure 5:
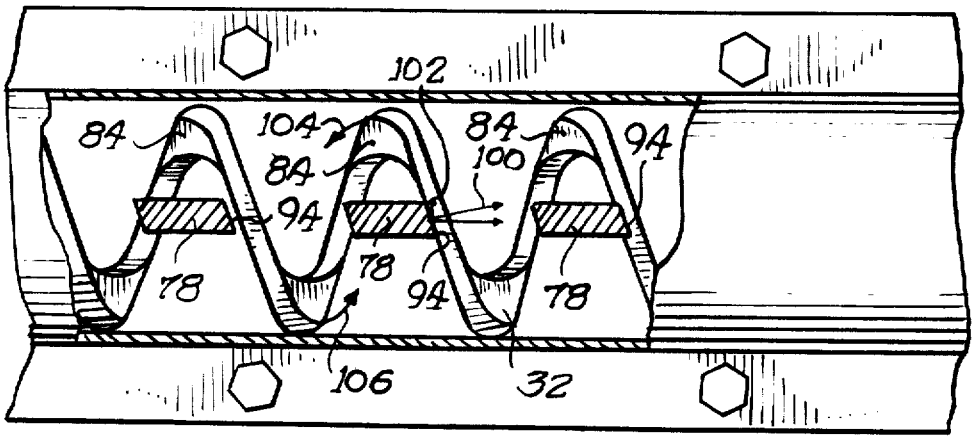
FIG. 5 is an enlarged partial sectional view taken generally along the line 5—5 of FIG. 4.
Figure 6:
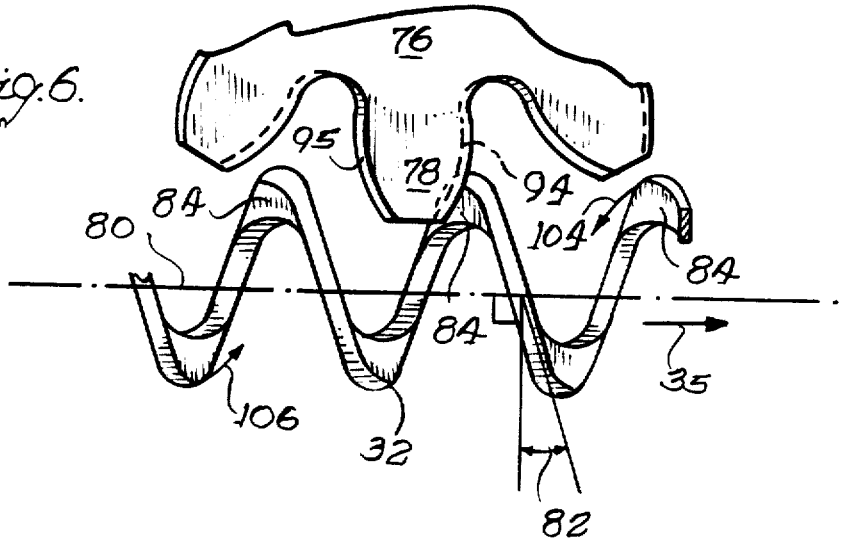
FIG. 6 is an enlarged partial plan view illustrating further details of a portion of the apparatus of FIG. 4.

As best seen in FIGS. 4 through 6, the feed delivery member comprises an elongate, helical member or coil defining a longitudinal helix axis 80. Preferably, the coil or helical member 32 is sufficiently flexible to bend about the helical axis 80 thereof so as to run freely, in an endless loop, about the various bends and turns in the upper conveyor loop 44, and especially through the end conduit connecting members 36 and 38 thereof. However, the material of the helical member is also preferably sufficiently resistant to expansion and contraction during longitudinal or axial motion along the upper feed delivery loop 54 to resist any substantial relative expansion or contraction of the respective individual flights or coils thereof. That is to say, the impellar wheel or driver element 76 drives the coil through the loop 44 in a substantially continuous fashion. Advantageously, however, it will be appreciated that the resiliency of the helical spring-like structure also aids in taking up or relieving inertial forces which occur during startup and shutdown of the motor 70 and impellar wheel 76. However, normally, the coil of helical member 32 is sufficiently free running and unimpeded in the conduit runs formed by the troughs and connecting conduits to run substantially freely therethrough without substantial expansion or contraction thereof.

The driver element or impellar wheel is a generally circular, toothed wheel or gear-like member having a plurality of circumferentially spaced, radially projecting teeth 78, for engagement with the respective flights or coils of the helical member 32, as is indicated in FIGS. 3 through 6. In accordance with the invention, the respective interengaged surfaces of the helical member 32 and teeth 78 are respectively cooperatively formed so as to cause rotation of the helical member 32 about its helix axis 80 simultaneously with the axial or longitudinal advancement thereof through the feed loop 44.

More particularly, and referring to FIGS. 3 through 6 in greater detail, it will be seen that the helical member also defines a given helix angle 82 (see FIG. 6). In the illustrated embodiment, this helix angle is on the order of 14 degrees 45 minutes but other helix angles may be utilized without departing from the invention. In accordance with the invention, the helical member is provided with a continuous flat helical surface 84 which is disposed substantially coextensively with the plane defined by the helix angle 82 relative to a plane normal to or perpendicular with the helix axis 80. In other words, the flat surface 84 substantially defines the helix angle 82 of the helical element 32. The helical member 32 is formed in symmetrical turns about the axis 80, extending therealong symmetrically in either direction.

Cooperatively, the teeth 78 of the impellar wheel or driver element 76 are also formed at an angle relative to the axis 90 thereof. Accordingly, the impellar wheel 76 in essence comprises a spiral or helical gear member, having a tooth angle 92 defined between driving faces 94 of the teeth and the axis 90 thereof. Preferably, this tooth angle (sometimes also referred to as a helix angle) is complementary with the helix angle of the helical element 32 so as to achieve complementary, flat surface-to-flat surface engagement between the surface 94 of each tooth and the adjacent portion of the surface 84 of the helical member 32. Such contact is illustrated for example in phantom line in FIG. 6 and in section in FIG. 5.

As best seen in FIG. 5, this engagement between the complementary angled surfaces is such that rotation of the wheel 76, as indicated by arrows 75, will impart force to the helical member 32 not only in the longitudinal or axial direction as indicated by arrow 35, but also a relatively small component of force in a direction normal thereto as indicated by force vector symbols or arrows 100, 102, in FIG. 5. Hence, this latter force component 102 will cause corresponding rotation of the helical member 32 in a direction generally indicated by arrows 104 and 106 in FIGS. 5 and 6.

In accordance with an important feature of the invention, the helical member therefore rotates about the helix axis 80 simultaneously with its longitudinal or axial motion or advancement therealong as it travels around the feed loop 44. In the illustrated embodiment, the tooth angle or helix angle of the helical gear or impellar 76 is substantially on the order of 14 degrees 45, minutes although other angles complementary with some other helix angle of the helical member may be utilized without departing from the invention.

Figure 7:
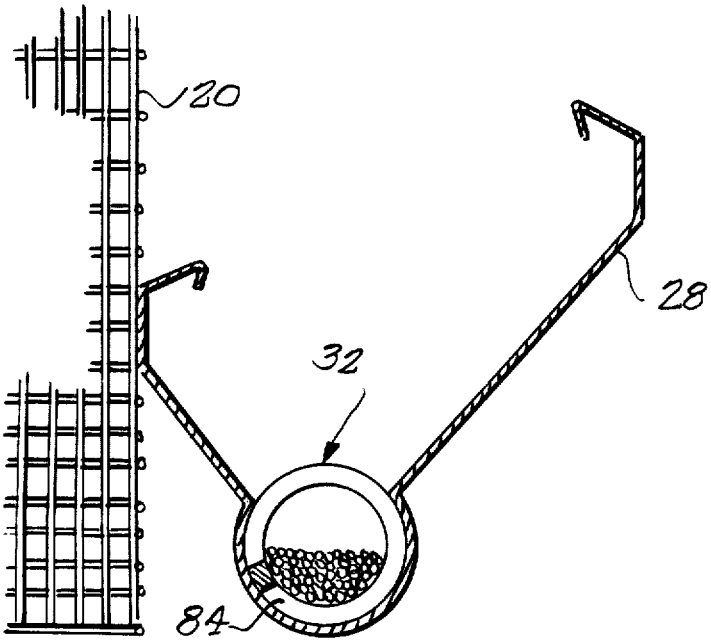
FIG. 7 is an enlarged sectional view taken generally in the plane of the line 7—7 of FIG. 1, and further illustrating the use of the conveyor system of the invention in connection with the confinement and feeding system of FIGS. 1 and 2.

It will be appreciated from the foregoing that the additional rotational motion imparted to the helical member will result in continuous mixing or agitation of the feed as it is delivered or carried along the feed loop 44. Moreover, the axial longitudinal movement thereof is preferably sufficiently rapid, such that the birds will be unable to reach the feed. As shown in FIG. 7, the feed is carried at a level well below the top of the helical member 32. Hence while the helical member is in motion during feed delivery, the birds will be unable to reach the feed.

This compound motion of the helical member 32 advantageously serves both of the objects of the invention stated hereinabove. Namely, it substantially prevents picking over the feed by birds near the delivery end of the system until the feed has been delivered all around the system and the delivery mechanism or helical member has stopped. Moreover, the rotational motion during delivery assures continued agitation of the feed for achieving and maintaining the desired mix of feed constituents all along the feed loop.

In accordance with the preferred embodiment illustrated, a radially leading portion 98 of each tooth 78 is also curved in a generally radially convergent manner, that is with respect for example to radius 99 as indicated in FIG. 4. This facilitates engagement and disengagement of each tooth with the flights or coils of the helical members substantially without interference therebetween. Preferably in this regard, the teeth 78 are generally involute in form, although other curvatures may be utilized without departing from the invention, as long as the surface to surface contact with helical member 32 and interference avoidance mentioned above are achieved. It will be noted that the essentially spiral or helical gear defined by the impellar member 76 is somewhat unusual in that it is relatively thin in the axial direction. Stated another way, the diameter of this member is relatively great, that is, many times greater than its axial extent or thickness.

Without limiting the invention in any way a number of additional dimensions of the helical member 32 and helical gear 76 are given in the following paragraphs.

The helical member or coil 32 preferably comprises a generally cylindrical wire member which has been flattened prior to coiling to define the flat surface 84. The wire thus flattened has a diameter of substantially on the order of 7.98 mm. (0.314 in.) and a transverse dimension between the flats of substantially on the order of 3.50 mm. (0.138 in.). The helical member is right-hand wound in the illustrated embodiment. The material utilized for the flattened wire is preferably a carbon steel wire of AISI grade 1066. Rockwell Hardness Rc38.7 to 42.9, tensile strength: 175/200,000 PSI; yield strength 153/180000 PSI, and starting diameter 6.15 mm. (0.242 in.).

The helical gear preferably comprises 12 teeth with a helix angle of 14 degrees 45 minutes (right-hand); standard pitch diameter 4.882 in.; outside diameter 5.669 in.; pressure angle 20 degrees; normal circular pitch 1.195 in.; transverse circular pitch 1.236 in. and gear thickness 0.250 in. The gear is preferably formed from SAE 1015 carbon steel of Rockwell hardness Rc 57-62 from 0.015 to 0.025 deep.

While particular embodiments of the invention have been shown and described in detail, it will be obvious those skilled in the art that changes and modifications of the present invention may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A conveyor system for delivering feed, [to a plurality of animal cages arranged in rows], said conveyor system comprising: an endless conduit extending along a conduit run [past at least one of said rows of cages] and through a feed trough [disposed adjacent the faces of said row of cages]; an elongate, continuous, endless material moving element extending through said endless conduit run and longitudinally movable therethrough, and driver means for advancing said endless material moving element through said conduit run; wherein said material moving element comprises an elongate helical member defining a longitudinal helix axis and bendable about said axis for following said endless conduit run, and wherein said driver means comprises a gear element having projecting teeth for engaging said helical [emmber] *member* for axially advancing said helical member in response to rotation of said gear element; the [interengaged surfaces of said] gear element teeth and [of] said helical member *having interengaged surfaces* being formed for rotating said helical member about the helix axis thereof simultaneously with said axial advancement thereof in response to rotation of said gear element.

2. A system according to claim 1 wherein said helical member further defines a given helix angle, and wherein a driven surface thereof comprises a continuous flat helical surface defining a plane angularly offset from a plane normal to the helix axis by said helix angle.

3. A system according to claim 2 wherein both said helix angle and [said] *a* tooth angle *defined by said gear element teeth* are substantially on the order of 14 degrees 45 minutes.

4. A system according to claim 2 wherein said gear element comprises a helical gear and wherein said teeth are equally circumferentially spaced and radially projecting therefrom, each of said teeth defining a driving surface at a helix angle complementary *with the helix angle of the helical member* for achieving flat, surface-to-surface engagement with said flat helical surface of said helical member to thereby cause said rotation of said helical member about said helix axis simultaneously with said axial advancement thereof in response to rotation of said gear element.

5. A system according to claim 4 wherein said gear element has an involute face portion defining a radially converging lead-in portion for facilitating engagement and disengagement thereof with said helical member flat surface.

6. A system according to claim 4 wherein said helical element is of a given pitch and lead length defining a plurality of like flights, and wherein said helical gear member is of a diameter for, and carries gear teeth of a selected number for, interfitting of one gear tooth at a time thereof intermediate adjacent flights of said helical element.

7. A conveyor system for delivering feed [to a plurality of animal cages arranged in rows], said conveyor system comprising: an endless conduit extending along a conduit run [past at least one of said rows of cages]; and through a feed [through disposed adjacent the faces of said row of cages] *trough*, an elongate, continous, endless material moving element extending through said endless conduit run and [longitudinally] *longitudinally* movable therethrough, and driver means for advancing said endless material moving element through said conduit run; wherein said material moving element comprises an elongate helical member defining a longitudinal helix axis and bendable about said axis for following said endless conduit run, and further including cooperating means on said driver means and on said helical member for rotating said helical member about the helix axis thereof while simultaneously axially advancing said helical member along and through said conduit run.

* * * * *